(12) United States Patent
Luzzatti et al.

(10) Patent No.: US 7,945,694 B2
(45) Date of Patent: May 17, 2011

(54) REALTIME MEDIA DISTRIBUTION IN A P2P NETWORK

(75) Inventors: Omer Luzzatti, Pardes-Hana (IL); Ofer Shem-Tov, Tel Aviv (IL); Oleg Levy, Tel Aviv (IL); Maxim Levy, Tel Aviv (IL)

(73) Assignee: Rayv Inc., Wilmington, DE (US)

( * ) Notice: Subject to any disclaimer, the term of this patent is extended or adjusted under 35 U.S.C. 154(b) by 161 days.

(21) Appl. No.: 12/294,836

(22) PCT Filed: Mar. 27, 2007

(86) PCT No.: PCT/IL2007/000392
§ 371 (c)(1),
(2), (4) Date: Sep. 26, 2008

(87) PCT Pub. No.: WO2007/110865
PCT Pub. Date: Oct. 4, 2007

(65) Prior Publication Data
US 2009/0248872 A1     Oct. 1, 2009

Related U.S. Application Data

(60) Provisional application No. 60/785,991, filed on Mar. 27, 2006, provisional application No. 60/847,677, filed on Sep. 28, 2006.

(51) Int. Cl.
*G06F 15/16* (2006.01)
(52) U.S. Cl. ........ 709/234; 709/201; 709/204; 709/219; 709/226; 709/231; 709/232; 709/248

(58) Field of Classification Search ............. 709/201, 709/204, 219, 226, 231, 235, 248, 232
See application file for complete search history.

(56) References Cited

U.S. PATENT DOCUMENTS 5,784,569 A * 7/1998 Miller et al. ............... 709/235
6,088,360 A   7/2000 Amaral et al.
(Continued)

FOREIGN PATENT DOCUMENTS
EP      1 633 111 A1    3/2006

OTHER PUBLICATIONS

Hefeeda et al., "Promise: Peer-to-Peer Media Streaming Using CollectCast", Proceedings of the 11th ACM International Conference on Multimedia. MM'03, 2003, pp. 45-54.

(Continued)

*Primary Examiner* — Michael Won
(74) *Attorney, Agent, or Firm* — Oliff & Berridge, PLC

(57) ABSTRACT

Nodes in a realtime p2p media distribution can act in the role of 'Amplifiers' to increase the total available bandwidth in the network and thus to improve the quality of the realtime media consumed by the viewers. Examples of such media consumptions are TV channels over the Internet, video on demand films and files, and media files downloaded to be consumed at a later time. Amplifiers are added to the p2p swarm by a mechanism that discovers the need for supplemental bandwidth in the swarm and orders nodes to join the swarm in the role of amplifiers. The amplifiers' main goal is to maximize the amount of bandwidth they supply (upload) to the swarm while minimizing the amount of bandwidth they consume (download).

4 Claims, 12 Drawing Sheets

U.S. PATENT DOCUMENTS

| | | | | |
|---|---|---|---|---|
| 6,310,886 B1 * | 10/2001 | Barton | | 370/462 |
| 6,359,900 B1 * | 3/2002 | Dinakar et al. | | 370/458 |
| 6,553,020 B1 * | 4/2003 | Hughes et al. | | 370/347 |
| 6,671,737 B1 | 12/2003 | Snowdon et al. | | |
| 6,901,446 B2 * | 5/2005 | Chellis et al. | | 709/226 |
| 7,080,400 B1 * | 7/2006 | Navar | | 725/139 |
| 7,123,586 B1 | 10/2006 | Cook | | |
| 7,181,523 B2 * | 2/2007 | Sim | | 709/226 |
| 7,289,453 B2 * | 10/2007 | Riedel et al. | | 370/252 |
| 7,406,691 B2 * | 7/2008 | Fellenstein et al. | | 718/104 |
| 7,652,989 B2 * | 1/2010 | Yang et al. | | 370/230 |
| 7,733,891 B2 * | 6/2010 | Reynolds et al. | | 370/412 |
| 2002/0078174 A1 * | 6/2002 | Sim et al. | | 709/219 |
| 2004/0136379 A1 * | 7/2004 | Liao et al. | | 370/395.21 |
| 2004/0236863 A1 | 11/2004 | Shen et al. | | |
| 2005/0044301 A1 * | 2/2005 | Vasilevsky et al. | | 711/1 |
| 2005/0083842 A1 | 4/2005 | Yang et al. | | |
| 2006/0010247 A1 | 1/2006 | Zimler | | |
| 2006/0080454 A1 | 4/2006 | Li | | |
| 2006/0224687 A1 | 10/2006 | Popkin et al. | | |
| 2006/0242315 A1 | 10/2006 | Nichols | | |
| 2006/0268908 A1 * | 11/2006 | Wang et al. | | 370/401 |
| 2006/0282536 A1 | 12/2006 | Popkin et al. | | |
| 2007/0005792 A1 * | 1/2007 | Collet et al. | | 709/231 |

OTHER PUBLICATIONS

Zhang et al., "CoolStreaming/DONet: A Data-Driven Overlay Network for Efficient Live Media Streaming," 2004.

Tran et al., "Peer-assisted Dynamic Content Distribution Networks," Proceedings of the IEEE conference on Local Computer Networks 30$^{th}$ Anniversary, 2005, pp. 1-8.

Hefeeda et al., "CollectCast: A Peer-to-Peer Service for Media Streaming," Multimedia Systems, 2005, pp. 1-31.

Ganesh et al., "Peer-to-Peer membership management for gossip-based protocols," IEEE Transactions on Computers, 2003, vol. 52, Issue 2, pp. 1-34.

* cited by examiner

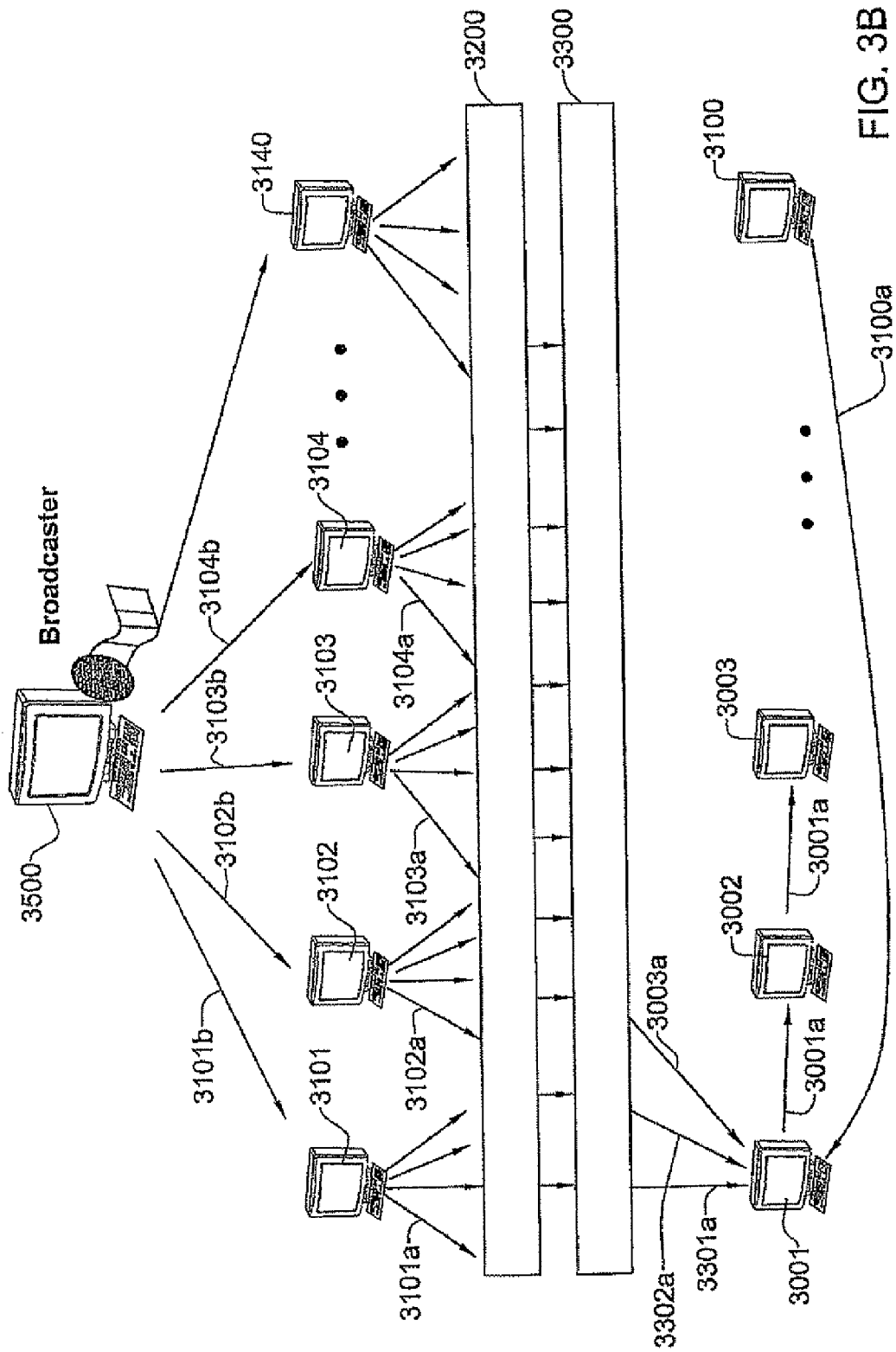

| Iteration | Download-rate-limit | Upload | Gain |
|---|---|---|---|
| 0 | 0 | 0 | 0 |
| 1 | 50 | 70 | 20 |
| 2 | 100 | 140 | 40 |
| 3 | 150 | 230 | 80 |
| 4 | 200 | 300 | 100 |
| 5 | 250 | 370 | 120 |
| 6 | 300 | 410 | 110 |
| 7 | 250 | 370 | 120 |
| 8 | 200 | 300 | 100 |
| 9 | 250 | 370 | 120 |

REALTIME MEDIA DISTRIBUTION IN A P2P NETWORK

This application claims priority from the following applications:
U.S. 60/785,991, filed March 27, and U.S. 60/847,677 filed Sep. 28, 2006, whose contents are herein incorporated by reference.

FIELD OF THE INVENTION

The present invention relates generally to the field of network communications and media distribution. More specifically, the present invention is related to a system and method for improving realtime media delivery in a distributed peer-to-peer (p2p) or grid network.

BACKGROUND OF THE INVENTION

The availability of the Internet enables new methods of directly distributing multimedia files and realtime media transmission to end-users in an electronic format The advantages associated with electronic distribution are pushing providers of media content to establish global distribution systems for digital content.

The availability of new compression algorithms for multimedia data has dramatically reduced the bandwidth and storage space required for the electronic distribution of these data. It enables a more efficient distribution of the data, and at a higher definitions In the coming years, the availability of broadband will encourage a significant part of the media industry to adopt the Internet as a distribution channel in direct competition with established channels such as cable or satellite TV.

Prior art systems provide various ways for transmitting multimedia such as voice and video over the Internet, Real-time streaming systems over the Internet, such as Microsoft, Real-Networks, SeaChange, and Broadbus deliver systems for real-time streaming content over the Internet. However, all of these systems operate in a 'centralistic' mode in which a server located in one point delivers the media (realtime or to be downloaded first and watched later) to the content consumers. One drawback associated with such prior art systems is the need to allocate bandwidth in the center to satisfy the needs of the consumers.

Distributed networks enable the media to be transmitted from one consumer to another without the need for centralistic streaming servers. As an example, peer-to-peer file sharing systems for PCs are well known in the industry and are a very efficient technology that can be used to deliver media content in a legitimate manner (such as AOL HI-Q, BBC) to complement or replace traditional client-server download or streaming. Examples for such peer-to-peer systems are Bittorrent and Gnutella. All of the above systems do not distribute the files (media or software) in realtime. User can download the files and consume them afterwards, but generally speaking, they cannot consume the media while downloading it.

Realtime streaming over a peer-to-peer network is a new phenomenon and examples of such systems are Coolstream (proposed in 2004 by Xinyan Zhang et "Coolstream: A Data Driver Overlay Network for Efficient Live Media Streaming), and CollectCast: (proposed in 2003 by Hefeeda et all "PROMISE: peer-to-per media steaming using CollectCast" in Proc. Of ACM Multimedia 2003 pages 45-54). However, these systems do not take into consideration the asymmetric nature of the real-world network, thus the fact that common values of upload bandwidth from nodes in file real-world network versus the download limits of the nodes. As an example, in ADSL network, as well as in Cable networks, the download bandwidth supplied to the users is lower than their available upload bandwidth.

There is, thus, a need in the art, to introduce the concept of nodes that act in the role of Amplifiers and upload more bandwidth to the network than the one they download.

LIST OF RELATED ART

U.S. Pat. No. 6,088,360: Dynamic Rate Control Technique for Video Multiplexer

A video multiplexer is disclosed which incorporates a dynamic rate control feature. MPEG encoded video signals for each channel are stored in a first-in it-out (FIFO) buffer. A packetizer for each channel detects the level in the FIFO buffer and issues a request signal to the video multiplexer that the channel desires to transmit the video signals on the network. The bandwidth allocation for a channel is either preselected by the video provider or automatically selected, and tokens are issued by a counter associated with each channel to give greater network access to those channels which require a higher bandwidth. A token multiplier detects the bandwidth needs of the various channels by detecting the rate that the FIFO buffer is being filled and automatically multiplies the number of consecutive packets which the packetizer may transmit over the multiplexer during a single grant.

US 2005/00883842: Method of Performing Adaptive Connection Admission Control in Consideration of Input Call States in Differentiated Service Network In the adaptive connection admission control method of the present invention, a corresponding ingress edge node performs connection admission control for a new connection within the amount of bandwidth initially allocated to each of paths between the ingress and egress edge nodes. The amount of remaining bandwidth allocated to a specific path Pr is compared wt an amount of bandwidth required for a call requesting new connection setup input to the corresponding ingress edge node. The amount of additional bandwidth to be requested from the bandwidth broker is predicted when the amount of the remaining bandwidth does not satisfy the amount of bandwidth required for the connection setup requesting call. The ingress edge node requests additional bandwidth from the bandwidth broker on the basis of the predicted amount of the additional bandwidth, changing bandwidth information of the corresponding path Pr, and performing connection admission control.

US 2006/0080454: System and Method for Receiver-Driven Streaming in a Peer-to-Peer Network A "PeerStreamer" provides receiver-driven peer-to-peer (P2P) media steaming for loosely coupled P2P networks. Peers in the network perform only simple operations, may cache all or part of the streaming media, do not collaborate with other peers, may be unreliable, and may drop offline or come online during any given streaming session. Clients in the network operate in real-time to coordinate peers, stream media form multiple peers, performs load balancing, handle online/offline states of peers, and perform decoding and rendering the streaming media. In one embodiment, the PeerStreamer uses high rate erasure resilient coding to allow multiple serving peers to hold partial media without conflict, such that clients simply retrieve fixed numbers of erasure coded blocks regardless of where and what specific blocks are retrieved. In another embodiment the PeerStreamer uses embedded coded media to vary streaming bitrates according to available serving bandwidths and client queue status.

US 2006/0224687 A1: Method and Apparatus for Offline Cooperative File Distribution Using Cache Nodes Methods and apparatus are provided for cooperative file distribution system employing one or more storage proxies to allow an offline receiver to obtain files or pieces thereof when the receiver comes online. A central tracker receives an indication from the sender that the sender has the file; determines if the receiver is online; and initiates a storage of the file on one or more storage proxies if the receiver is not online. A proxy service can identify one or more potential storage proxies that can store the file and that each satisfy one or more predefined resource criteria. The sender can send a request to one or more of the storage proxies from the list of storage proxies to act as a storage proxy for the communication between the sender and the receiver. The potential storage proxies compare one or more resource measures to predefined criteria; and provide an acceptance if the one or more resource measures satisfy the predefined criteria.

US 2006/0242315 A1: System and Method for Intelligent Buffering and Bandwidth Allocation A method comprises generating a bitrate template comprising histogram of bitrate as a function of time for each of a plurality of previously-encoded multimedia programs, each bitrate template indicating actual bitrate requirements for every given point of time within the associated multimedia program, and, prior to transmitting one of the plurality of media programs to a multimedia node, identifying the previously-generated bitrate template for said multimedia program, and, during the mission of said multimedia program, changing a bandwidth allocation for the multimedia node in anticipation of an actual bitrate spike indicated in the bitrate template for said multimedia pro.

SUMMARY OF THE INVENTION

In accordance with certain embodiments, the present invention provides a system and method to enable realtime transmission of media in a distributed network (also known as peer-to-peer or grid network). The system and method of the invention dynamically discover the need for additional bandwidth and provide the needed bandwidth by allocating resources from other devices that are connected to the overlay network. In accordance with certain embodiments, these additional devices that share their bandwidth but do not consume the media (e.g. do not watch the stream) are referred to as Amplifiers. In addition to the amplifiers, the network and the swarm contains also Consumers which are nodes (and usually users) that are consuming e.g. watching the media. Note that consumers share their upload bandwidth as well as Amplifiers.

In accordance with certain embodiments, the system and method of the invention provide a mechanism by which the amplifiers function, that is when and how they join and depart from the swarm and what is the logic by which they provide the qualitative service to the swarm and specifically to the media consumers.

In accordance with certain embodiments, the system and network of the invention guarantee a certain number of bootstrap amplifiers that provide an additional amount of bandwidth for guaranteeing a faster joining time for potential media consumers. This is especially important for newly joined consumers when there are a very low number of consumers in the swarm. As an example of the latter, a channel with no consumers may still have a few amplifiers that will serve the first joining node and will provide with a better watching experience.

In accordance with certain embodiments, additional peers are added to the artwork and function as amplifiers for guaranteeing high-quality realtime transmission of media.

In accordance with certain embodiments, the problem that the invention solves can be described briefly as follows: in a network in which the sum of the bandwidth contributed (uploaded) to the overlay network by the devices (for the media delivery) is lower than the bandwidth needed (downloaded) for a high-quality media consumption, additional bandwidth has to be supplied to the swarm.

In accordance with certain embodiments, the present invention provides a mechanism to allocate is additional bandwidth by using other devices that will download less bandwidth than the bandwidth they upload to the swarm and by doing so will balance the bandwidth shortage and will enable realtime distribution of the media. The ability to download less than upload am be only achieved when the Amplifiers download segments that are needed by more than one consumer, thus they download a piece of media and distribute it to several consumers.

As specified above, the bandwidth that the amplifiers download should be lower than the bandwidth that they upload. In accordance with certain embodiments of the present invention various manners are provided to achieve this goal (thus to find the right downloaded bandwidth (50 in the example above) so that the Gain is maximized.

In accordance with certain embodiments, the amplifiers, added when there is a need for additional bandwidth, have also a mechanism to discover that they are not needed and to shut-down their own operation in such a way, an undesired situation, in which the amplifiers operate without a real need, and transfer bandwidth from one to the other without real consumers in the swarm, is avoided.

In accordance with certain embodiments, in order to supply the best service to newly joined viewers to the swarm, especially in the case of a media consumed by only a few consumers, and where the system has to guarantee that some of the amplifiers never shut down, we refer to such amplifiers as 'bootstrap amplifiers'.

In accordance with certain embodiments, in order for the amplifiers to contribute the maximum possible bandwidth to the swarm, they need to download appropriate segments of media that are needed by the consumers. Namely, they have to decide which segments (pieces of the media) to download in order to provide the best service to the consumers of the content. This decision has several parameters such as at leas one of the following: the type of the media to be retrieved, the distribution of the segments in the network, the missing parts needed by the consumers, and the ability to download pieces that can provide a service to several consumers. In accordance with an aspect of the invention, there is provided a system for enabling a real-time transmission of media in a distributed network of nodes that includes swarm nodes; the swarm nodes include consumer nodes that are configured to process transmitted media; the system is configured to dynamically identify a need for additional bandwidth required to transmit said media and in response thereto allocating to the swarm network at least one amplifier node for providing the additional bandwidth, thereby enabling the transmission of said media.

In accordance with an aspect of the invention, there is also provided a method for enabling a real-time transmission of media in a distributed network of nodes that includes swarm nodes; the swarm nodes include consumer nodes that are configured to process transmitted media; the method comprising:

(a) dynamically identifying a need for additional bandwidth required to transmit said media;

(b) allocating to the network at least one amplifier node for providing the additional bandwidth, thereby enabling the transmission of said media.

In accordance with an aspect of the invention, there is further provided a computer program comprising computer program code means for performing all the steps of Claim 18 when said program is run on a computer.

In accordance with certain embodiments of the invention, there is provided a system which is configured to dynamically identify the need for additional bandwidth using centralized means.

In accordance with certain embodiments of the invention, there is further provided a system wherein said centralized means includes at least one server node.

In accordance with certain embodiments of the invention, there is still further provided a system which is configured to dynamically identify the need for additional bandwidth in a distributed fashion.

In accordance with certain embodiments of the invention, there is yet ter provided a system wherein said need is triggered by a node suffering from lack of sufficient bandwidth.

In accordance with certain embodiments of the invention, there is still further provided a system wherein said need is triggered by said centralized mean by monitoring the network of portion thereof.

In accordance with certain embodiments of the invention, there is still further provided a system wherein each one of said amplifier nodes is configured to download less bandwidth than the bandwidth it uploads.

In accordance with certain embodiments of the invention, there is still further provided a system further comprising means configured to use criterion for determining the conditions for at least one amplifier to join to the swarm network.

In accordance with certain embodiments of the invention, there is further provided a system further comprising means configured to use criteria for determining the conditions that at least one amplifier leaves the swarm network.

In accordance with certain embodiments of the invention, there is further provided a system further configured to allocate at least one bootstrap amplifier that provides an additional amount of bandwidth for guaranteeing a shorter duration from connection to actual viewing, in respect of potential media consumers.

In accordance with certain embodiments of the invention, there is further provided a system wherein each amplifier is capable of downloading given segments of media that is needed by the consumers, in order to provide a qualitative service to the consumers of the content.

In accordance with certain embodiments of the invention, there is further provided a system wherein said given segments for downloading are decided according to at least one of the following parameters: (i) type of the media to be retrieved, (ii) rare segments in the network, (iii) missing parts needed by the consumers.

In accordance with certain embodiments of the invention, there is further provided a system wherein each amplifier node is configured to operate in order to maximize the amplifier's gab defined as upload bandwidth minus the download bandwidth.

In accordance with certain embodiments of the invention, there is further provided a system wherein each amplifier node is configured to maximize amplifies gain by increasing and decreasing downloaded bandwidth rate limit in small steps till the maximum Gain is reached.

In accordance with certain embodiments of the invention, there is further provided a system wherein said amplifier node is configured to maximize amplifier's gain by favoring download of segments that are a mathematical combination of at least two actual media segments and that can be uploaded to other, nodes.

In accordance with certain embodiments of the invention, there is further provided a system wherein the mathematical combination being the XOR function.

In accordance wt certain embodiments of the invention, there is still further provided a system wherein number of additional required amplifiers complies with the following equation: missing bandwidth for download equals to or smaller then sum of the Gains (upload minus download) of all the additional amplifiers.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 3-B illustrates exemplary operational scenarios, in accordance with an embodiment of the invention;

FIG. 3-C illustrates an exemplary operational scenario, in accordance with an embodiment of the invention;

DESCRIPTION OF THE SPECIFIC EMBODIMENTS

Figure 1:
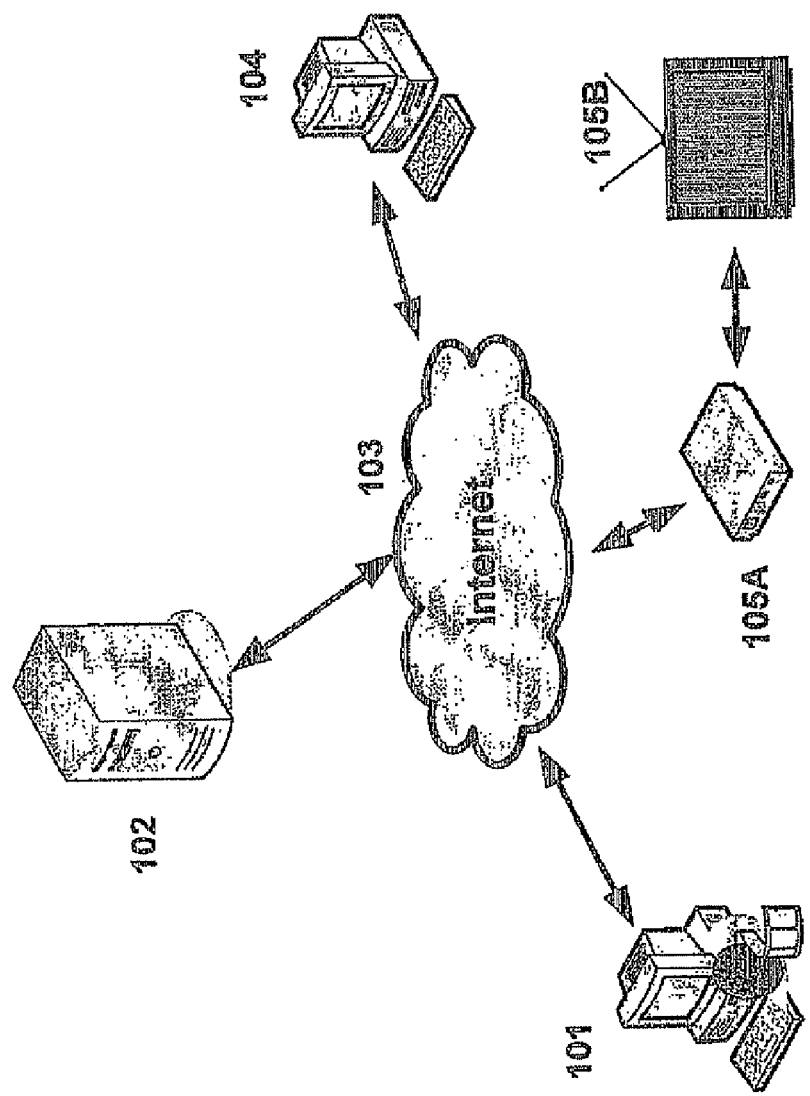
FIG. 1 illustrates the hardware diagram of the system, in accordance with certain embodiment of the invention.

Unless defined otherwise, all technical and scientific terms used herein have the same meaning as commonly understood by one of ordinary skill in the ad to which this invention belongs. Generally (although not necessarily), the nomenclature used herein described below are well known and commonly employed in the art. Conventional methods are used for these procedures, such as those provided in the at and various general references. Accordingly, the following definitions are pro-vided for clarity of understanding only and are by no means binding: "File sharing" includes: sharing and distributing files to other users over an electronic network.

"Node" includes: an addressable device or an entity connected to a network or connected to a group. For example, a data download reception unit a user, a device, an operator, a portable multimedia device, or a server can be referred to as a node, Node may also refer to a module of a software system such as, for example, a media player application.

'Peer' is an equivalent name for Node. However, the term "peers" is used to refer to the group of nodes connected to a specific node from the specific node's perspective.

"Swarm" includes: a group of many nodes all of which participate in the same media distribution In the particular case of electronic networks and/or peer-to-peer network, a swarm may refer to a group of nodes participating in die data transfer of one identified, common media object A node can be part of different swarms when transferring multiple media objects. For example, a peer can be part of swarm #1 (distributing TV program #A) and swarm #2 (distributing movie #B). Sometimes this is referred to also as "overlay network".

"Amplifier" includes: a node in the swarm whose role is to increase the total swarm bandwidth. The amplifier's main goal is thus to download a given amount of bandwidth and to contribute (upload) a larger amount of bandwidth to other nodes that are either consumers of the media or amplifiers themselves. The relationship of the download stream and upload strewn of the amplifier is termed the 'Gain'.

"Bootstrap amplifier" includes an amplifier that may remain with a negative Gain in older to guarantee that to a swarm with no consumers, newly added consumers will have enough bandwidth to start with. Bootstrap ampler typically (although not necessary) never shuts down even if its gain is negative. The reason for having bootstrap amplifiers in the system is to provide newly joined nodes with an immediate service.

"Gains" —includes: the upload bandwidth of an amplifier minus the downloaded bandwidth by it; an Amplifier tries to maximize its gain. An Amplifier with a negative gain will shut down unless it is a Bootstrap Amplifier.

"Consumer" includes: a node in the swarm usually used by users/viewers to watch the media.

"Realtime distribution of Media" also called "Streaming" includes the following meaning: data is a continuous flow of data that must be ultimately presented to a user in a particular sequence in real time. Moreover the flow of data should be presented to the user close to the time it was transmitted from the media source. Digital samples representing an audio signal, for example, mud be converted to a sound wave in the same sequence they were transmitted, and at exactly the time spacing they were generated, or some user-specified alternative. Digital data representing video frames require assembly into the proper sequence in the frame for presentation on a display together, and successive frames must display at the correct real-time rate. Realtime distribution may refer to live events and also to pre-generated content that is consumed while being delivered. Realtime distribution of Media (Streaming) can be realized in various known per se techniques.

In the description herein, the term "viewer" is construed to include a real-world user who is watching the media and the tent "broadcaster" is construed to include the entity (user or community or an automatic agent) transmitting the media. "Client" is construed to include the software or hardware component to watch the media.

In the context of the above referred to definition of node, this term also includes, in accordance with certain embodiments, an entity in the system that is participating in the media delivery itself. A node can have different roles in the transmission of the media: a consumer—whose main object is to fetch the media for the viewer; and an amplifier—whose main objective is to help consumers by contributing its bandwidth to the swarm.

In certain embodiments, the nodes are connected to a server that controls the Amplifiers by allocating certain ones and assigning tem the role of bootstrap amplifiers.

In certain embodiments, media transmission and its control is done in a distributed way within the distributed nodes, e.g. using known per se Mechanisms as described in Ganesh Gossip.

Bearing these definitions in mind (provided for clarity in a non-binding fashion), it is noted at the invention is illustrated and described in a preferred embodiment but it ray be produced in many different configurations, forms and materials. There is depicted in the drawings, and will herein be described in detail, various embodiments of the invention, with the understanding that the present disclosure is to be considered as an exemplification of the principles of the invention and the associated functional specifications for its construction, and is not intended to limit the invention to the embodiment illustrated. Those skilled in the art will envision many other possible variations within the scope of the present invention.

Attention is first drawn to FIG. 1 illustrating the hardware diagram of the system, in accordance with a certain embodiment of the invention.

Thus, the system comprises a broadcasting apparatus (101) that has the media and can be accessed by nodes in the network that may request the media or pieces of it. The broadcasting apparatus can also transfer the media itself to other devices in the electronic network. The media may be a live stream or files accessible to the device. There are several possible ways to implement this apparatus such as, for example, a computer, a media center PC, a personal video recorder, a networked DVD player, a computer with access to a website, a portable media player, a PDA, a mobile phone, or equivalent devices. There may be one or more apparatuses that can be used for one or more users.

The broadcasting apparatus(es) are connected to an electronic network (103), such as the Internet or mobile network, in order to make the content and the information about the content available for nodes to download.

A server (102) or equivalent processing device can receive and process the information received from one or more broadcasting apparatuses (such as the channel's playlist the shows, the files, and similar). In certain embodiments, the media itself may not be distributed via the server. There may be multiple instances of these servers in the system.

The receiving devices (104, 105) are capable of receiving and transmitting the data forming a media content in a broadcast/multicast transfer or a peer-to-peer transfer. When operating in a peer-to-peer mode, each receiving device is a potential source or sink of data for one or more other receiving devices. Software is usually present on this device so that the device can also operate as the media player. The receiving devices (104, 105) are capable of rendering the content in a direct play-back session (wherein the media player renders the content selected by the user) or in an indirect playback session. A computer, a media center PC, a server, a router, a television with an electronic programming guide, a personal video recorder, a networked DVD player, a computer with access to a website, a portable media player, a PDA, a mobile phone, or equivalent devices are examples of receiving devices.

Note that the invention is not bound by the system architecture described with reference to FIG. 1.

In the description below, reference is occasionally made to the operation of the server, in particular in the context of determining whether there is a need to provide bandwidth support to a given channel(s) by allocating amplifier(s) nodes, and if in the affirmative, to identify the appropriate amplifier nodes that are applicable. In is context, attention is drawn to U.S. patent application 60/847,677 dated Sep. 29, 2006 entitled "Method and System for Real-Time Streaming Over a Grid Network" hereinafter the architecture application) whose contents is incorporated herein by reference, and to the non-limiting examples to FIG. 2 and FIG. 5 of the application as well as to FIG. 4B and FIG. 4C below.

Figure 2:
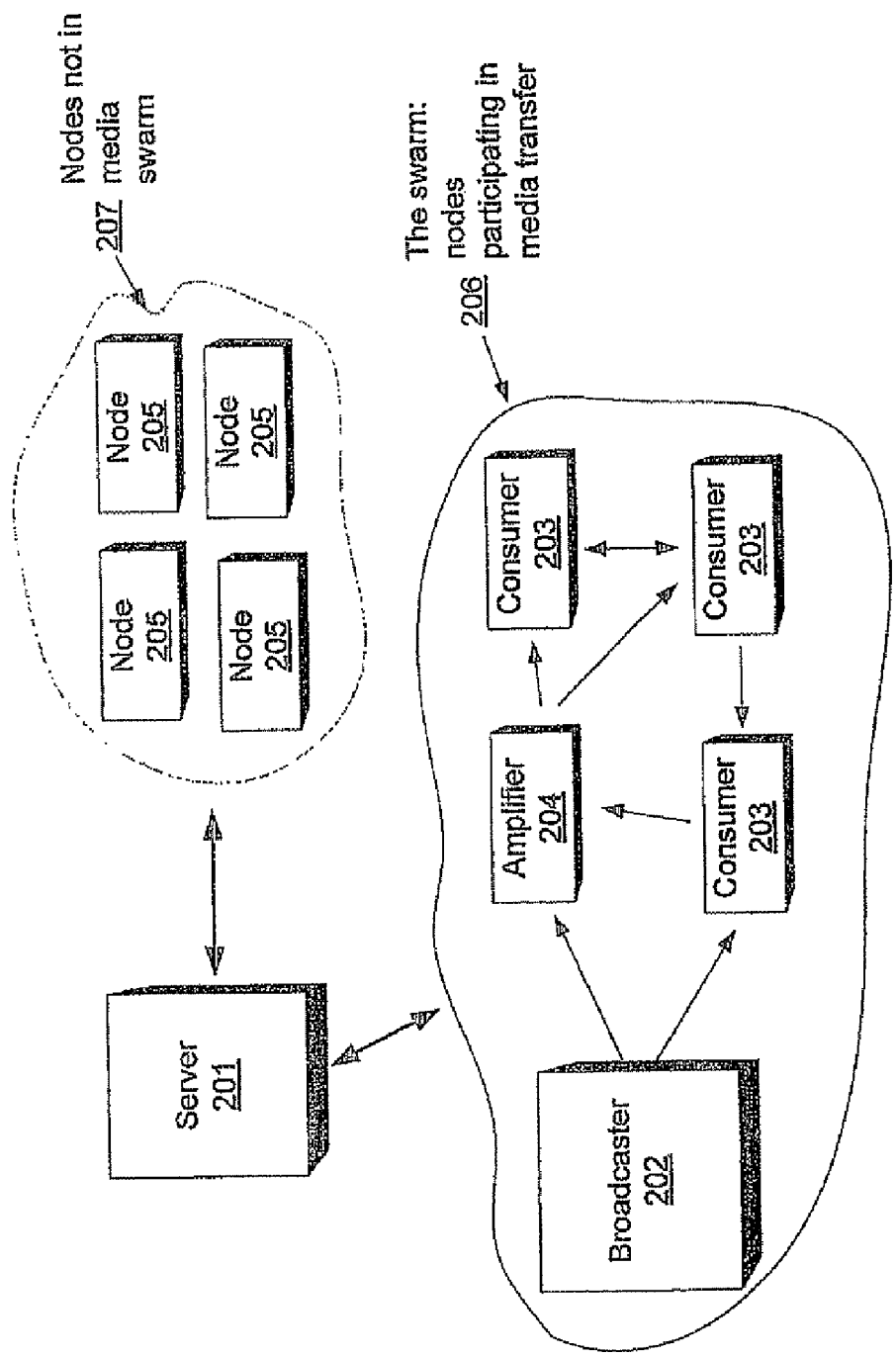
FIG. 2 illustrates the general architecture of the system, in accordance with certain embodiment often invention.

Bearing this in mind, attention is drawn to FIG. 2, illustrating the general architecture of the system, in accordance with a certain embodiment of the invention.

Thus, the Server (201) is connected to all devices, including the broadcaster (202) that transmits the media or parts of herein. The transmission of the media may be a live transmission of live events (such as sports, news, concerts), or live transmission of pre-generated content (such as old-movies), or simply transmission of content that may be consumed later on and is being stored on DVR or similar devices. In accordance with certain embodiments, realtime transmission (streaming) of the media to the consumers is improved. Thus, the Broadcaster (202) and the Amplifiers (204) are helping the realtime transmission of the media to the consumers (203) that are watching the media or saving it. All these nodes constitute the Swarm (206) of that specific media transmission/file sharing/TV channel. In addition to the nodes (consumers and amplifiers and broadcasters) in the swarm (206), other nodes (205) may be connected to the server, and are currently neither consuming nor helping (as amplifiers) this specific swarm and this media transmission. Note at these nodes may be parts of other swarms by consuming, amplifying or even broadcasting another media file or TV channels.

It should be her noted that although in certain embodiments, the server is accessed by all nodes and has a central role in the system, in accordance with other embodiments there is provided a complete (or partial) distributed mechanism, using for example Gossip protocols (by Ganesh and others). In such embodiments the information peers management is all done by the nodes in the network without the intervention of a server in the middle.

Note that the invention is not bound by the system architecture described with reference to FIG. 2.

Before moving on, there follows an exemplary operational scenario (with reference to FIG. 3) for illustrating the role of amplifier, in accordance with an embodiment of the invention.

Figure 3A:
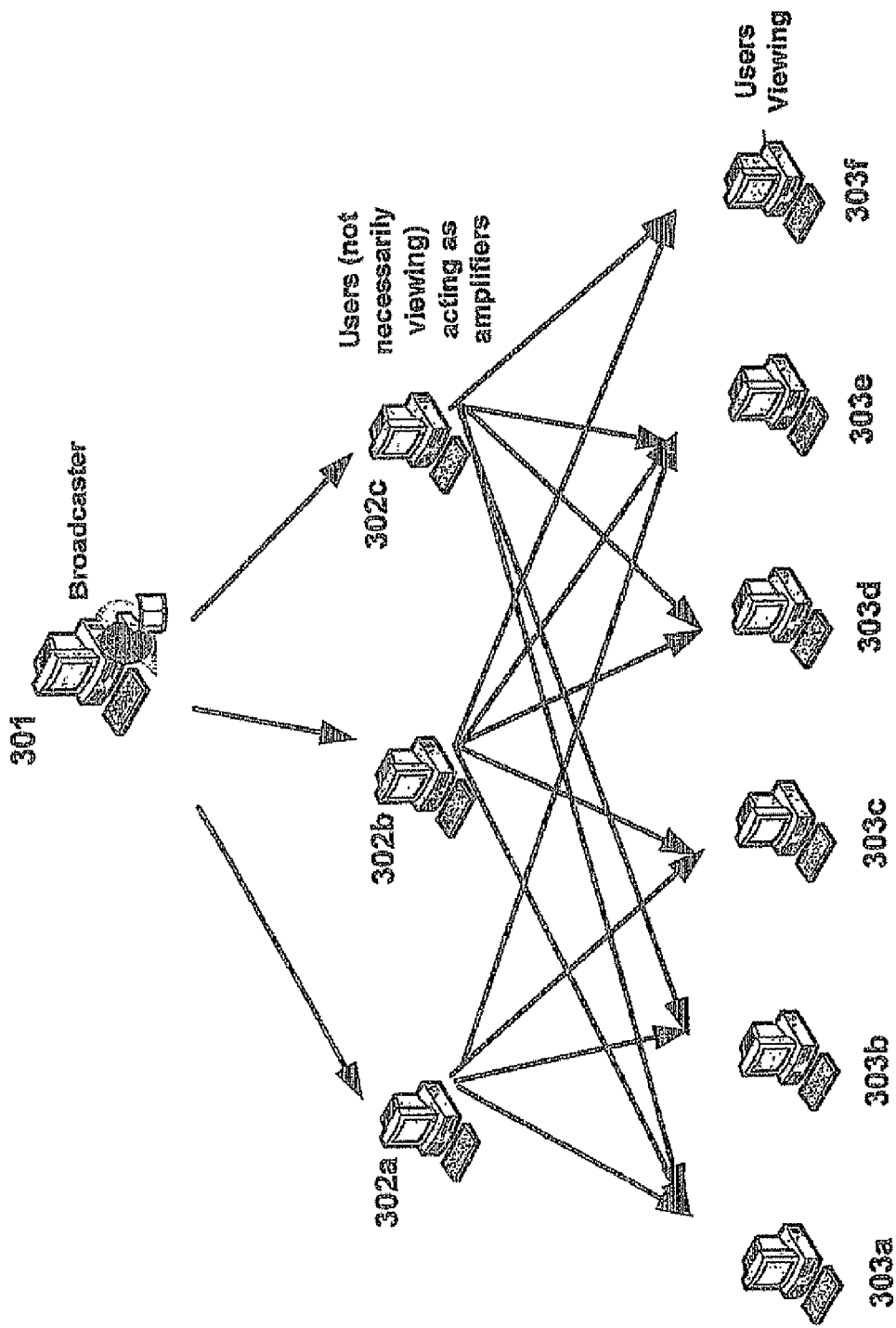
FIG. 3-A illustrates exemplary operation scenarios, in accordance with an embodiment of the invention.

Thus, FIG. 3A describes a situation in which 6 viewers (303a,b,c,d,e,f) would like to watch a transmitted show but the broadcaster (301) does not have the required upload bandwidth to support all of them, for example if the video stream is of 800 Kbps (namely download rate is 800 Kbps per each one of the specified viewers, giving rise to a total of 4.8 Mbps) and the broadcast upload is only of 2 Mbps, it readily arises that only 2 (out of six) viewers are supported (total of 1.6 Mbps) and only partially the rd viewer (until the maximum 2 Mbps upload is consumed). The amplifiers 302a,b,c (user's client that are not watching the stream) receive parts of the media and stream it (upload it) to the actual viewers. If every amplifier also has, say 2 Mbps upload (toted 6 Mbps) then the total upload provided by them is sufficient to support the group of viewers (requiring a total of 4.8 Mbps download rate). As a result by adding Amplifiers, e.g. nodes that do not watch the channel but help in its transmission, the system managed to support the 6 viewers.

The invention is not bound by the specified example of FIG. 3A.

Consider the following additional non limiting example, with reference to FIG. 3B. Assume 100 viewers (e.g. nodes 3001-3100 that serve viewers—of which nodes 3001, 3002, 3003 ... 3100 are shown) who wish to watch a movie or a TV channel that requires an average of 800 Kbits/sec (i.e. download bandwidth of 800 Kbits/sec). Further assume that the each node has an upload bandwidth of 200 Kbits/sec. The upload link between node 3001 and 3002 is marked 3001a, the upload link between node 3002 and node 3003 is marked 3002a, and so forth. The overall bandwidth needed for upload is 100*800 Kbits/sec but the maximum bandwidth available for upload is only 100*200 Kbits/sec. Note incidentally, that by this example, each node holds sufficient volume of media for supporting the maximum upload bandwidth of 200 Kbits/sec to a mating node (through the specified channels (3001a, 3002a, ... 3100a.)

In accordance with certain embodiments, a mechanism discovers the lack of bandwidth and assigns additional Amplifiers (by this example 3101, 3102 and onwards) to join the media distribution swarm and to contribute their upload bandwidth to it. In order to be efficient, these Amplifiers will have to download less than they upload and to supply the supplemental bandwidth for completing the required missing bandwidth of 100*600 Kbits/sec. Thus, for example, if an average Amplifier uploads 200 Kbits/sec and downloads only 50 Kbits/sec, the number of additional Amplifiers will have to satisfy the following equation:

(The Download needed)100 viewers*800 Kbps+$A$*50 Kbps=(The Upload available)100 viewers*200 Kbps+$A$*200 Kbps+Broadcaster upload 2 Mbps Thus, $A$*(200−50) Kbits/sec+2000=100*(800−200) Kbits/sec=>$A$=387 (or simplify and if it is assumed that the broadcaster upload to be insignificant the rounded number is 400 Amplifiers).

By average, tree amplifiers will be assigned to each client node and will feed The required supplemental bandwidth considering that each amplifier can upload 200 Kbits/sec and that the missing bandwidth is 600 Kbits/sec for each consumer node. Assuming, for instance, that broadcast station 3500 can upload at least 2 Mbits/sec, it thus supports the download rate (50 Kbits/sec) of 40 amplifiers; designated in FIG. 3B as 3101 to 3140.

Since, as specified above, nearly 400 amplifiers are required to feed the missing bandwidth, additional layer of amplifiers (designated schematically as 3200) can be used. This layer may include 160 amplifiers that are coupled to the 40 amplifiers 3101 to 3140. Each one of the amplifiers 3101 to 3140 has an upload rate of 200 Kbits/sec and can thus "Sport" four amplifiers in layer 3200, each downloading 50 Kbits/sec, giving rise to the specified 160 amplifiers at layer 3200. This however is still not enough, since as specified above there are required nearly 400 amplifiers altogether. Now additional level of amplifiers can be used (designated generally as 3300) such that each amplifier in layer 3200 can support (having upload rate of 200 Kbits/sec) up to 4 amplifiers in layer 3300 (each having download rate of 50 Kbits/sec). Layer 3300 has thus 640 amplifiers considerably more than the required 387 amplifiers for supporting also the 100 consumers 3001-3100. In FIG. 3B, 3 Amplifiers in layer 3300 (not shown) upload media data to node 3001, rough channels 3301a, 3302a and 3303a giving rise to a total of 600 Kbits/sec. Each of to Amplifiers will download its respective 50 Kbits/sec content from amplifiers in layer 3200 Note that there are 300 amplifiers that are needed in order to support the missing bandwidth of the 100 consumers. However, the specified analysis showed that nearly an additional 400 amplifiers are required. The difference in number of amplifiers (387 vs. 300) is required in order to compensate for the limited upload bandwidth that the broadcaster can provide (only 2 Mbits/sec) whereas the required bandwidth that is required for download by the consumer nodes is considerably higher, i.e. 100*800 Kbits/sec.

Note that the example of FIG. 3B is simplified for clarity only and therefore should not be regarded as binding. For instance the topology of the nodes does not necessarily comply with tree data structure and accordingly any form of graph is applicable. By way of another example, it is not mandatory to have each node uploading another node and few amplifiers completing the required bandwidth. Thus, by way of non-limiting example, a given node may receive media from few uploading peers and the supplemental media (if required) from 0 or more amplifiers, whereas another node may receive the desired media only from amplifiers, etc. By still another non-limiting manner it is obviously not mandatory to have some ordered manner of providing media. Likewise, providing media from a node to a neighboring node (e.g. 3001 to 3101, and 3101 to 3102, etc.) are provided by way of example only. Still further it is not required that each amplifier will have the same download/upload rate. Those versed in the art will readily appreciate that other variants are applicable, all as required and appropriate.

Figure 3C:
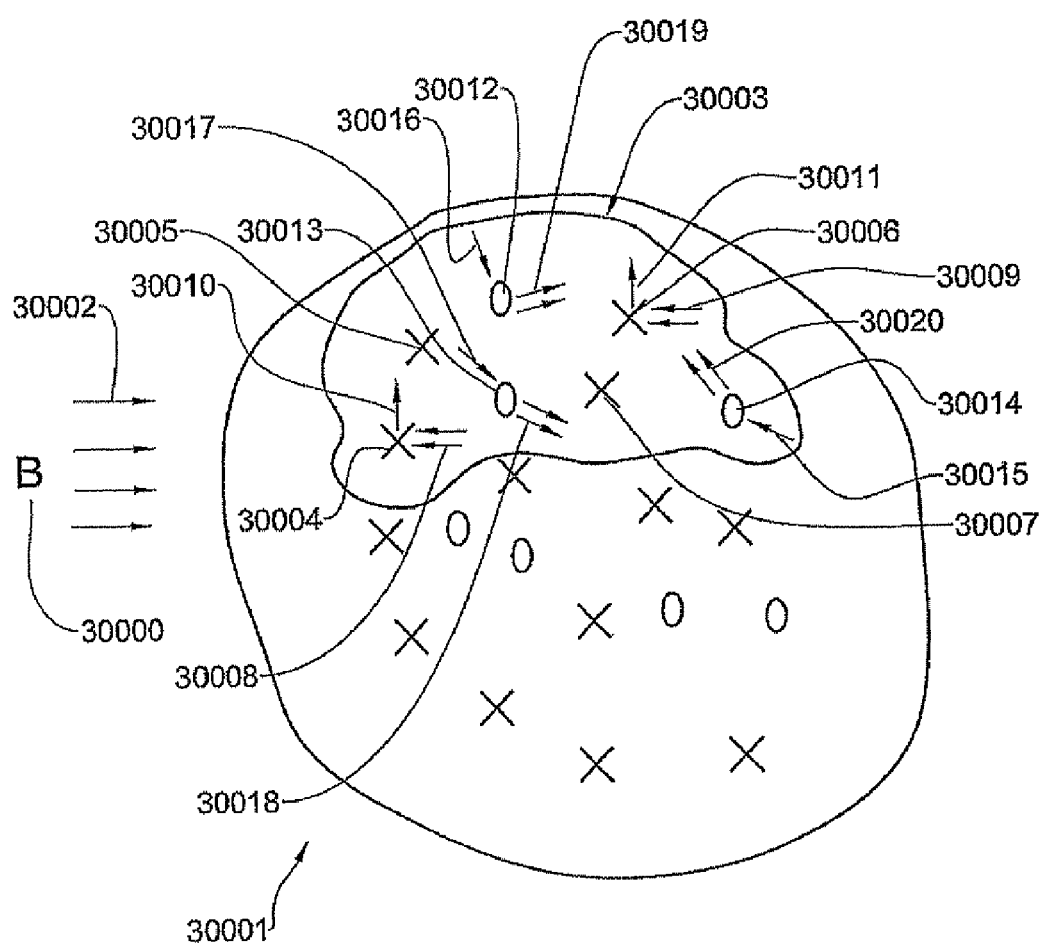

Bearing this in mind, attention is drawn to FIG. 3C illustrating an exempla operational scenario, in accordance with an embodiment of the invention. FIG. 3C illustrates in a more generalized fashion a broadcast node 30000 (out of few possible available broadcasters—not shown), and a network of plurality of nodes 30001 that receive an upload media from broadcaster 30000 through link 30002 from among the nodes in the network a swarm 30003 includes few nodes marked as X' (30004, 30005, 30006 and 30007). The nodes have a incoming double arrow, say 30008 and 30009 and a outgoing single arrow, say 30010 and 30011, indicating that the download rate (incoming arrow) is higher than the upload rate (outgoing arrow), Also shown are a few amplifier nodes marked as '0' (30012, 30013, 30014). The nodes have a incoming single arrow, say 30015, 30016 and 30017 and a outgoing double arrow, say 30018, 30019 and 30020, indicate that the download rate (incoming arrow) is lower than the upload rate (outgoing arrow). The drawing does not show any specific link between the peers (and therefore does not set a specific topology) inditing that any known per se connection is applicable. The amplifiers will be assigned by the server to the peers based on a need to assist in supplying the desired bandwidth, e.g. in compliance with the specified architecture application.

The invention is of course not bound by the specified examples and a fortiori not to the specific architecture and allocation of Amplifiers to nodes.

Figure 4A:
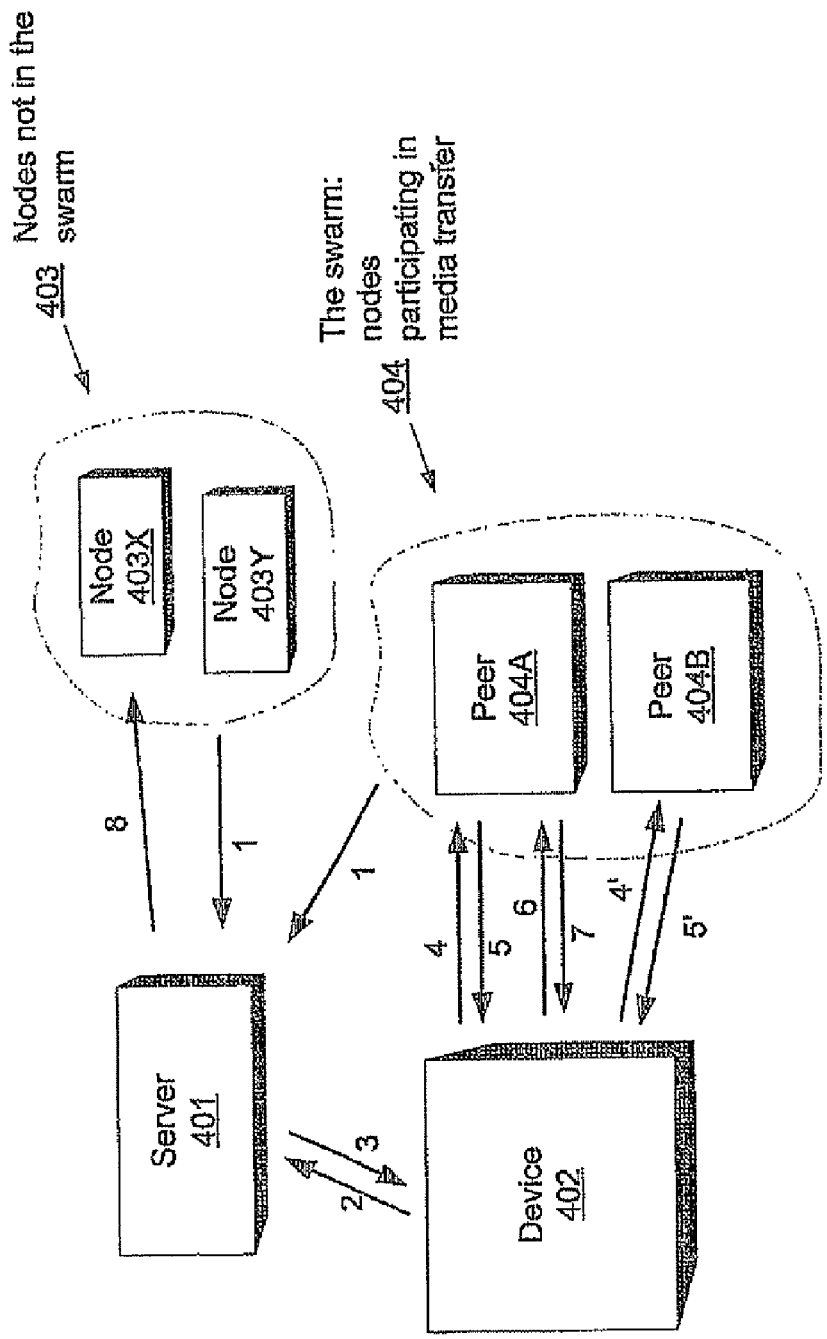
FIG. 4A illustrates a general flow chart of a sequence of operation in the system, in accordance with a certain embodiment of the invention.

Bearing is in mind, attention is drawn to FIG. 4A, illustrating a general flow chart of a sequence of operation in the system, in accordance with a certain embodiment of the invention.

Thus, all nodes 404A, 404B, 403X, and 403Y are connected to the system either as consumers, amplifiers, or broadcasters. 404A and 404B are part of the swarm that transmits media content such as TV channel, a movie, or other; 403X and 403Y are connected to the system but are not part of the same swarm (they may be part of other swarms). All of these nodes send periodic information (1) to the server 401. This information is of a statistical nature regarding the node's role and several other parameters regarding the node's status (video quality, number of peers connected). A message can be sent for every specified time such as 10 seconds.

There follows a description of a flow in which device 402 would like to join t swarm described as a consumer. Note that an Amplifier may also send the 'joining' request, most likely after an indication for the need to add amplifiers was received by it after being originated by some entity in the swarm, see e.g. FIG. 2 in Architecture application describing calling of the new amplifier, and FIG. 5 describing the flow in which the server evaluates the status and calls a new amplifier. Initially, the device 402 sends a request verb (2) indicating its wish to join the media's swarm and the role it is to take. Thus, if it is a consumer node, this is triggered by a viewer who wishes to join the channel and if it is an amplifier, the server has triggered the operation (see, e.g. FIGS. 2 and 5 of the architecture application). The server sends back an acknowledgement (response) verb (3) after authenticating the device/user and authorizing the request in a known per se manner, The server also sends back a list of nodes to combine the device's group of peers. This group is a subset or equal to the channel's swarm nodes and includes the best subgroup of the nodes to contribute the specific device's needs. As an example, if the device joins the swarm as a consumer, the server will send back a group of nodes from the swarm that have enough bandwidth to contribute to the device.

The device then (4, 5 and 4', 5') connects to the peers (or to a subset of which) and asks them to participate in the media transmission. The node starts then to request information about the segments (media content pieces) acquired by the peers it is connected with. The exchange of the information is called the 'Segment information Exchange'. The media itself is not exchanged at this stage, but only the information about it. For instance, and by way of non-limiting example the information may include a bit value which, when set indicates that data is available, and when reset, indicates that data is not available. The information may further include data indicative of the type of data, say audio, video etc. Accordingly the actual data will be uploaded only if the information is processed and found satisfactory, say the specified bit is set and the type of data (say audio) is as required. This is, of course, only an example and the information may include other content, all as required and appropriate depending upon the particular application.

Afterwards, the node evaluates the Segment Information received from the peers and schedules the fetching of the segments from the pees. By this example, after the evaluation of the peers acquired segments, the node decides to retrieve a certain segment (e.g., in a random manner) from 304A (indicated at 6, 7). Other segments may be retrieved from other peers. In a certain embodiment, a node may be connected to 10-20 other peers and fetch different media segments from all of them.

As explained above, the server receives periodic information and statistics regarding the channels/media transmission status and individual indication from the nodes (see, e.g. FIGS. 4B and 4C below). In case the server deduces that new amplifiers are needed in the swarm in order to maintain a good quality media transmission, the server may address a specific node (8) to the swarm and request its services by adding it to the swarm. This mechanism is described, in accordance with certain embodiments, in more detail below.

Note that the invention is not bound by the specific sequence of operation described with reference to FIG. 4A.

Figure 4B:
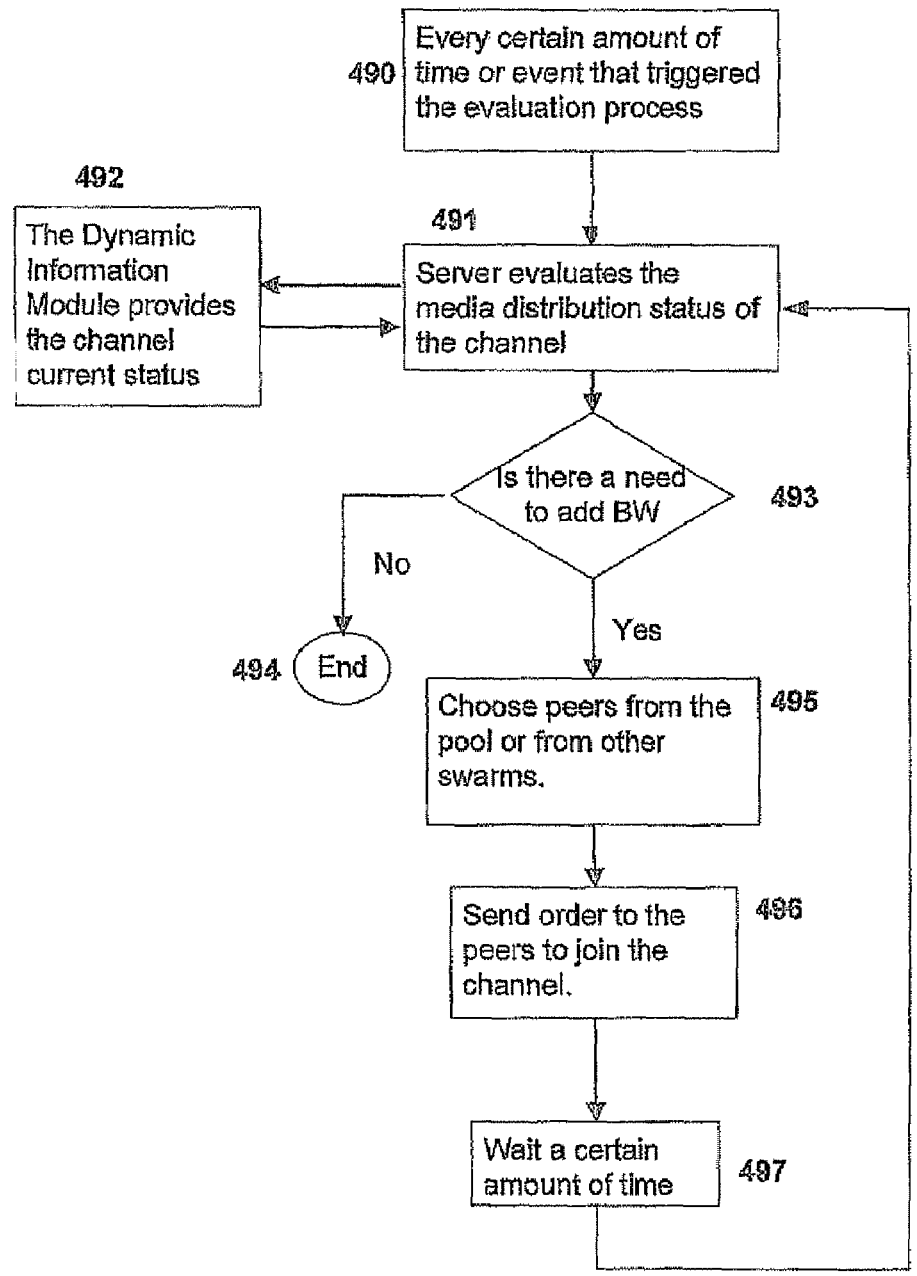
FIG. 4B illustrates a sequence of operation of a server logic in accordance with an embodiment of the invention.
Figure 4C:
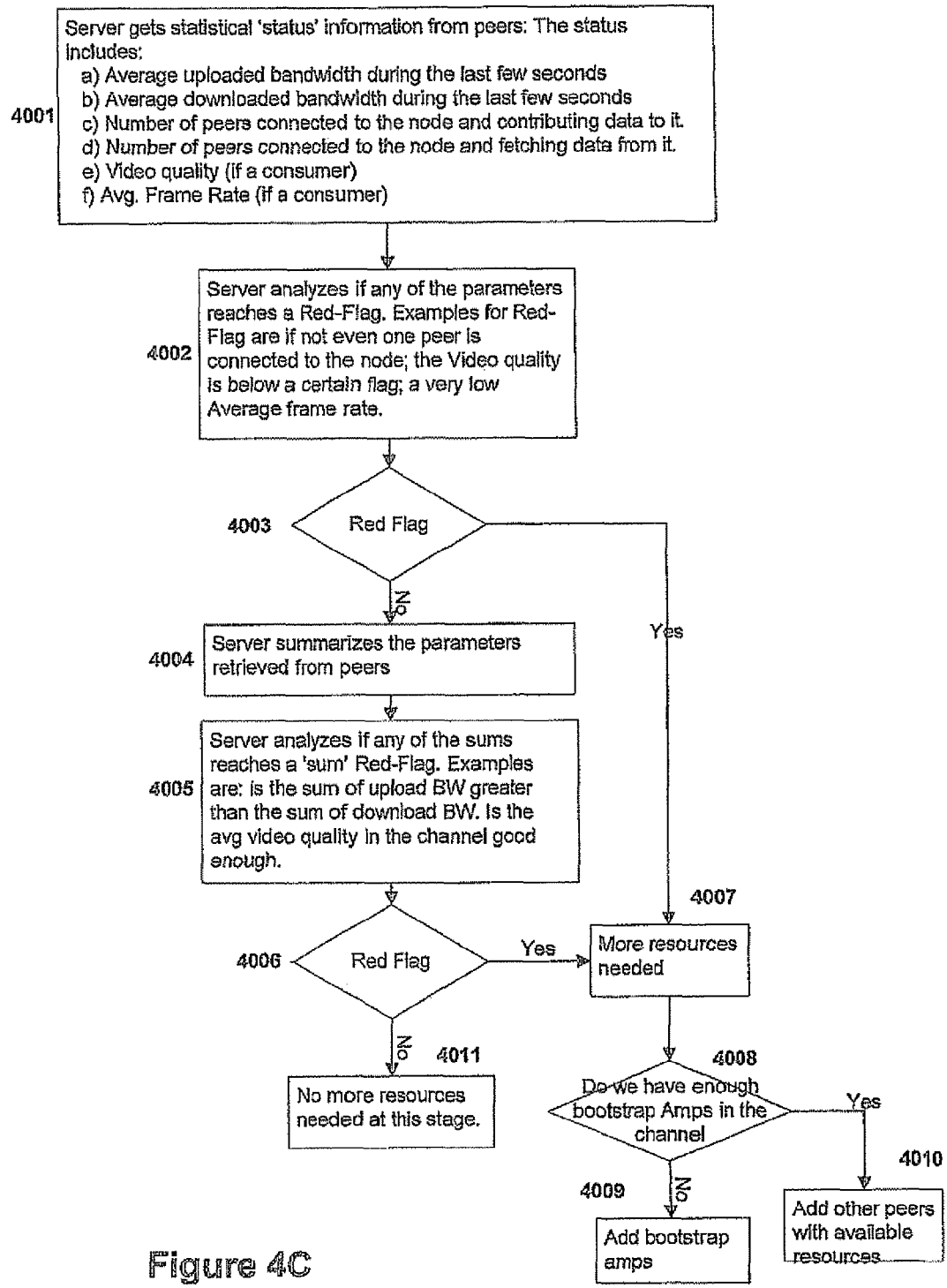
FIG. 4C illustrates a sequence of operation of a server logic in accordance with an embodiment of the invention.
Figure 5:
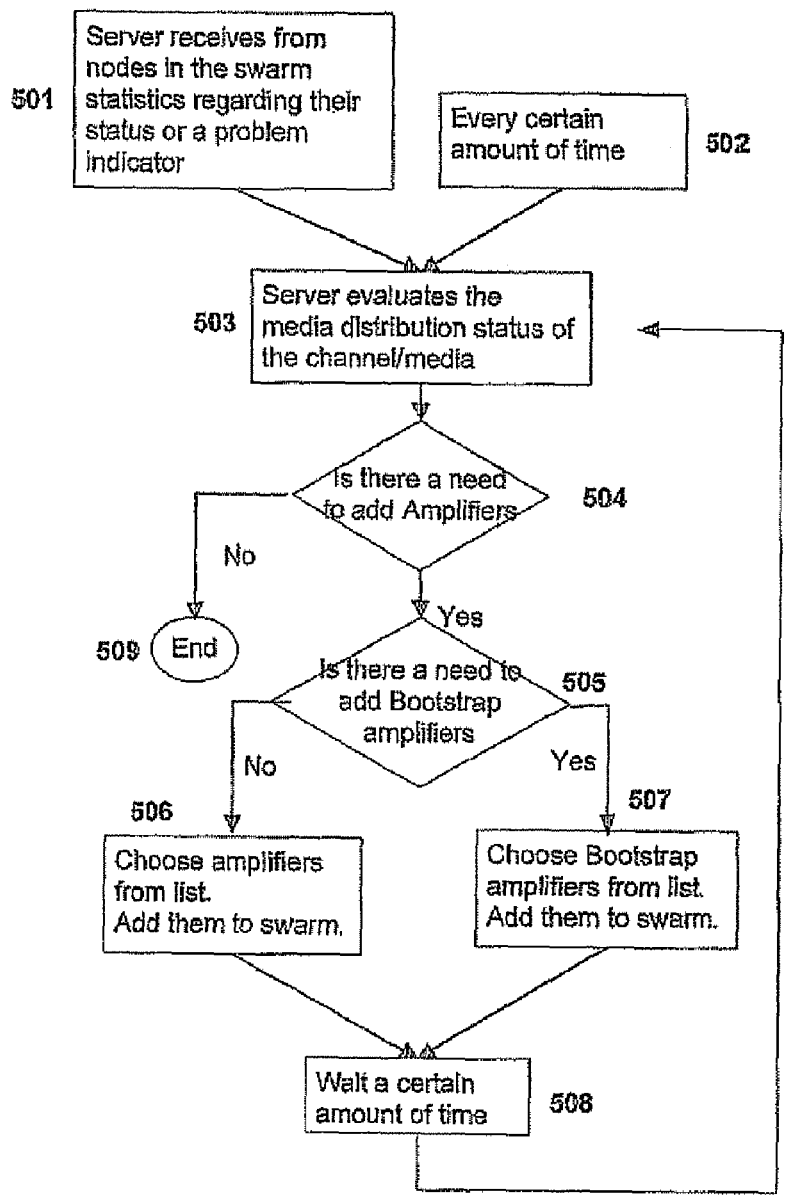
FIG. 5 illustrates a flow chart of the mechanism and parameters to add an amplifier to the swarm, in accordance with certain embodiment of the invention.

Before turning to FIG. 5, attention is drawn to FIGS. 4B and 4C, illuminating a sequence of operation of a server logic in accordance with an embodiment of the invention.

Thus, as shown in FIG. 4B in step 490 every certain amount of time or event at triggered the evaluation process, then in step 491 the server evaluates the media distribution status of the channel. The dynamic information module 492 will be described in flier detail with reference to FIG. 4C.

Next, in step 493 is there a need to add bandwidth (BW), and if yes, in step 495 peers from the pool or from other swans are chosen, otherwise, the sequence ends (494). Moving on with step 496, orders are sent to the peers to join the channel, and then 497, where a certain amount of time is waited.

Turning to FIG. 4C, (elaborating module 492 in FIG. 4B), in step 4001 the server gets statistical 'status' information from peers. The status includes:

a) Average uploaded bandwidth during the last few seconds
b) Average downloaded bandwidth during the last few seconds
c) Number of peers connected to the node and contributing data to it
d) Number of peers connected to the node and fetching data from it
e) Video quality (if a consumer)
f) Average frame Rate (if a consumer).

Then in step 4002 the server analyzes if any of the parameters reaches a Red-Flag. Examples of Red-Flag are if not even one peer is connected to the node; the Video quality is below a certain flag; or there is a very low average frame rate, and if red flag is detected (4003) then in step 4007 more resources are needed, and subsequently an inquiry is made at 4008 which asks whether enough bootstrap AMPS in the channel is available, and if yes 4009 other peers with available resources are added, otherwise (no) in step 4010 bootstrap amps are added. Revering to 4003, in the case of no, in step 4004 the server summarizes the parameters retrieved from peers, and thereafter 4005 the server analyzes if any of the sums reaches a 'sum' Red-Flag. Examples of this are whether the sum of upload BW is greater than the sum of download BW, and whether the average video quality in the channel is good enough. In step 4006 the Red-Flag is tested. In the case of no, 4011 no more resources are needed at this stage, otherwise (yes) the procedure described in steps 4007,4008, 4009 and 4010 is performed.

The invention is not bound by the specific examples described with reference to FIGS. 4 and 4C.

Attention is now drawn to FIG. 5 illustrating a flow chart of the mechanisms and parameters to add an amplifier to the swarm, in accordance with a certain embodiment of the invention.

FIG. 5 deals with the control and management of the server of the clients that function as amplifiers. The problem this mechanism solves is the need to have sufficient bandwidth in the system to support the customer and the way to add amplifiers so that the bandwidth need is met and that newly joined consumers will have a fast and smooth entry to the system. In accordance with certain embodiments, the need for support in bandwidth is either triggered by a node suffering from lack of sufficient bandwidth or detected by a server who monitors the channel, see e.g. the architecture application and FIGS. 4B and 4C.

The process describes the steps and operations performed by the elements of the system, as well as the interaction between said elements including one or more nodes. In the first step of this process, the server is triggered (501) either by the 'swarm' namely from one of the nodes in the swarm by sending statistics, by sending a signal indicating a problem in the media delivery, by sending an indication about a problem in the number of peers the node sees, (see e.g. the architecture application and FIGS. 4B and 4C), or (502) by a timer indicating the need to evaluate the media transmission quality.

Afterwards, in (503), the server evaluates the channel status (the media delivery status). This is done by su g-up the entire information about the nodes in the channel. T information includes the roles of the nodes (amplifiers, bootstrap amplifiers, consumers), the bandwidth they download, the bandwidth they upload, the average video quality the consumers see, and file number of peers they have and the number of partners they work with. Other parameters may also affect this decision, (see e.g. the architecture application and FIGS. 4B and 4C), for instance whether the channel (the media) is being transmitted in a good enough quality.

The evaluation of the situation at (503) leads to the question whether the channel (the media) is being transmitted in a good enough quality or else additional Amplifiers should be added (504). The quality is calculated by combining the media quality (such as PSNR for video quality) and the 'streaming' quality calculated from several other parameters such as the percentage of received segments out of the ordered one, the number of partners each consumer has, and others (see e.g. FIG. 4C). In case the quality of the service is not sufficient, the server evaluates if the Amplifier to be added should be a Bootstrap Amplifier (discussed in greater detail below) that never shuts down or not (505) and decides what type of Amplifier to add (506, 507). According to certain embodiments, some channels may have a specific number of bootstrap amplifiers to guarantee a smooth operation of the channel. The serve then waits and evaluates the situation again. In case the media is being distributed at a satisfactory level (e.g. if no more resources are needed, see 4011 at FIG. 4C, the process ends (509)).

The decision which amplifier to add is derived from an analysis of the list of amplifiers in the pool; amplifiers that send periodic information (see e.g. the architecture application and FIG. 4C), to the server regarding their status. The peers that the servers decided to support (by allocating amplifier(s) thereto) should contain the nodes with problems in the media distribution (see also FIG. 7 of the architecture application). Note that in accordance with certain embodiments, there is no need to subtract amplifiers from the list due to the self shut-down algorithm which is part of the amplifier's logic and that causes the Amplifiers to shut themselves down when they do not contribute to the swarm. Note that the invention is not bound by the specific sequence of operations described with reference to FIG. 5.

Figure 6A:
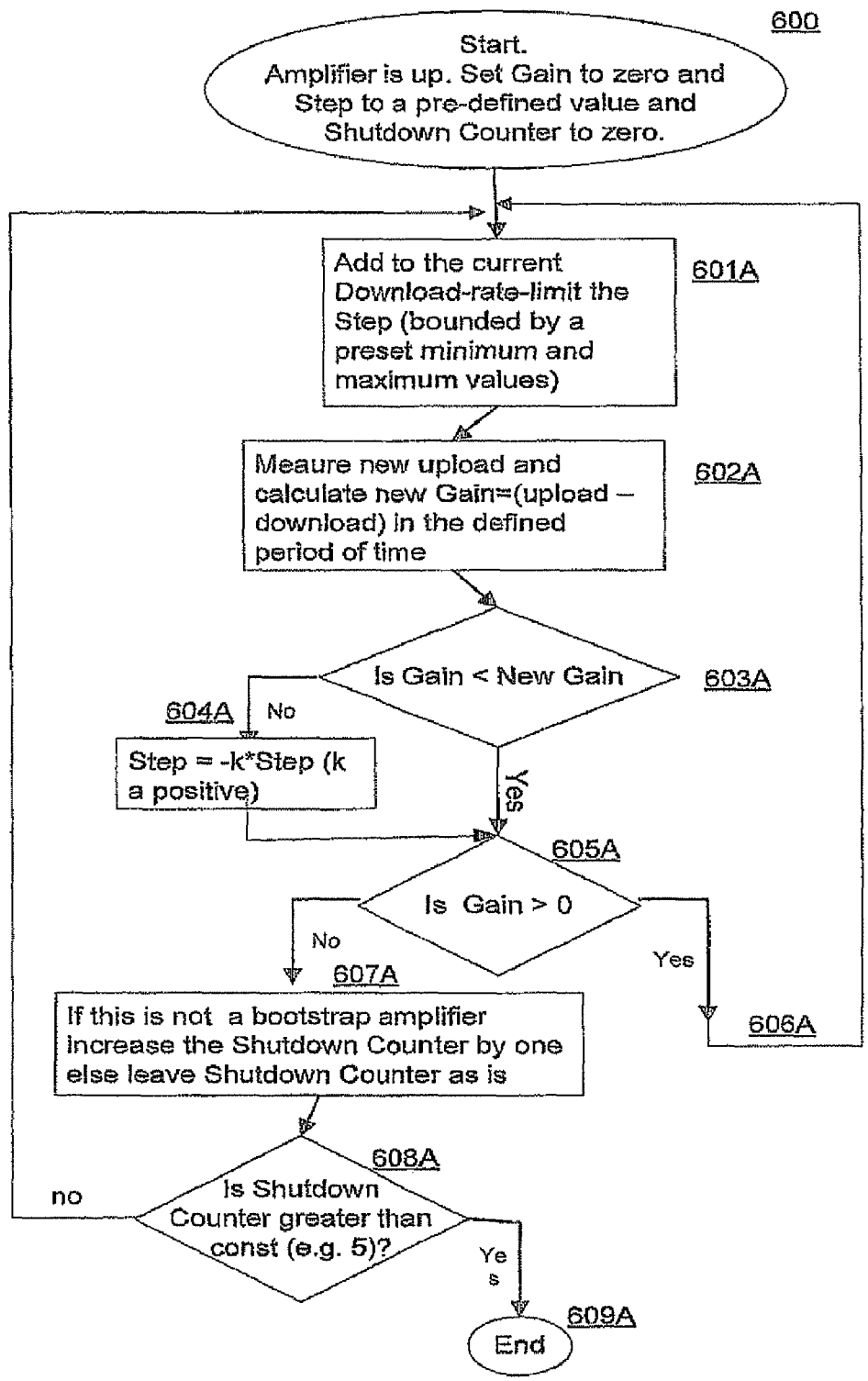
FIGS. 6A, 6B, 6C illustrate the amplifier's logic, in accordance with a certain embodiment of the invention.
Figures 6B, 6C:
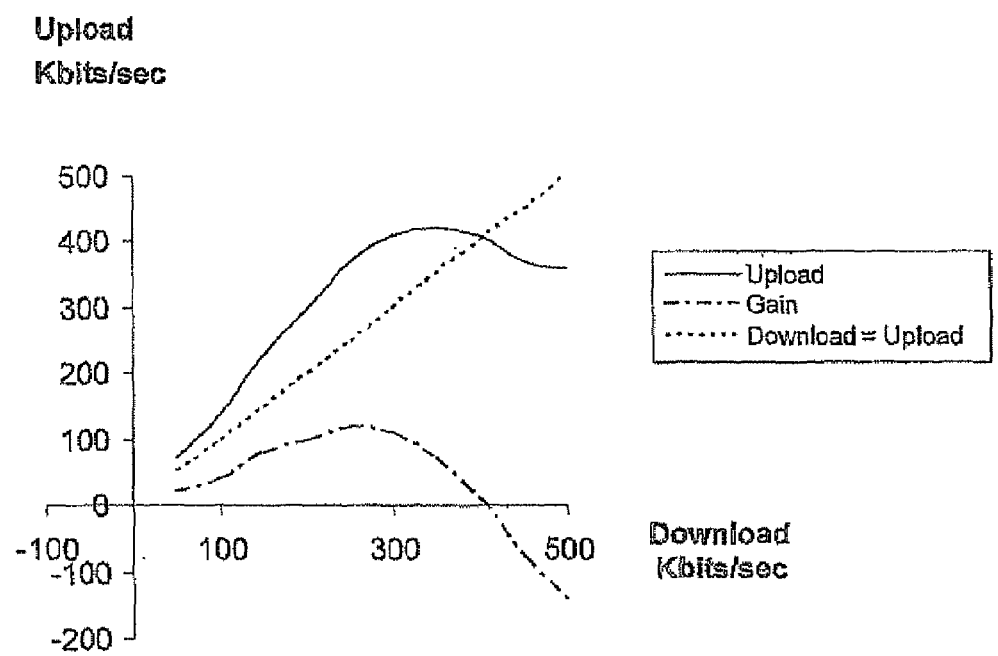

Attention is now drawn to FIGS. 6A,6B,6C illustrating the amplifier's logic, in accordance with a certain embodiment of the invention.

The amplifier internal logic, in accordance with this embodiment, is based on the requirement to maximize the bandwidth taken from the amplifier while minimizing the bandwidth taken by it, or, to maximize the Amplifies Gain (defined as upload bandwidth minus the download bandwidth). Evidentially, an amplifier with a negative gain consumes more than it supplies and thus has a negative impact on the network's overall bandwidth. The amplifiers' logic can be described generally as searching and reaching the maximum Gain by increasing and decreasing the downloaded bandwidth rate lit in small steps till the maximum Gain is reached.

This procedure is described in FIGS. 6A, 6B, and 6C. FIG. 6A describes the algorithm's flow; FIGS. 6B and 6C depict an example to explain the algorithm, in accordance with this embodiment.

As shown, at 600A the Amplifier is up and starts to run. Then the amplifier adds to its original download-rate-limit 601A the value of Step and starts to download from the other peers in the swarm for a defined time at a rate of current download-rate-limit plus Step. The amplifier then evaluates the upload bandwidth and calculates the New Gain (602A—originally set to zero or to another value based on history or default). The amplifier then evaluates if the new Gain is better or worse than the previous one (603A) and changes the direction of the Step (604A) if the Gain wasn't increased possibly multiplied by a certain value k). Thus, if the Gain has improved, the amplifier continues in the same direction (i.e., adding Step to its currently download rate limit—see 606A), otherwise the interval changes its sign and the amplifier sets the download-rate-limit less than before (604A or more if the interval was negative previously). Note the K>1 is used in accordance with certain embodiments, to increment more than one step in each iteration. By way of non-limiting example, at the onset k=1, if in each one of X consecutive iterations (X predefined) an increment in the download rate is made by a factor of step (without reversing direction—step 604A), then an increase in download rate can be made by a factor of k times step (k>1). If 604A is encountered, then k can be set again to 1.

This algorithm can be explained using the example depicted at 6B and 6C (values of 6C are presented graphically at 6B). In the example, the initials values of the download-rate-limit and the Gain are set to zero (iteration 0 in FIG. 6C); the Step is set to 50 Kbits/sec. As in 601A, the download rate limit is increased to 50 Kbits/see and the upload value is calculated after a certain amount of time. As can be seen in 6C (Iteration 1) the upload value measured is of 70 Kbits/sec, thus the Gain: is 70–50=20 Kbits/sec as shown on the graph at 6B as well. Due to the increase of the Gain (New Gain 20 is greater than Gain 0 [step 603 A]) and the fact that the Gain is greater than zero, the Step is added to the download-rate-limit which is now set to 100 Kbits/sec. The upload rate is now calculated again and, as seen at the table at 6C (Iteration 2), the value received is 40 Kbits/sec. Since the value 40 is again higher than the previous Gain 20, the Step is added to the download-rate-limit which is now set to 150 Kbits/sec. In the example 6B, 6C, the Gain increases till Interval 6 in which the Gain decreases from 120 Kbits/sec to 110 Kbits/sec. At is point the Step will change its direction (k=1 at 604A) and will go back to a download-rate-limit of 250 Kbits/sec. If the upload value received per each download-rate-limit remains constant, the amplifier will go up and down in the graph around the points 200-300 Kbits/sec, maximizing its Gain.

Reverting to FIG. 6A, 607A and 608A describe the amplifier shutdown mechanism, in accordance with certain embodiments of the invention. The amplifier shuts down after going up and down for a few iterations (e.g. 5) and receiving a negative Gain time after time. Bootstrap amplifiers always remain up, so the shutdown counter in their case remains zero.

Note that the invention is not bound by the specific sequence of operation of FIG. 6.

In accordance with certain embodiments, in order to have a fast start-up for newly added consumers' nodes, the term of Bootstrap Amplifiers is introduced. Bootstrap amplifiers don't shut down themselves and 'work on void', even when there are no consumers in the swarm, assuming that they will need the upload bandwidth for news nodes. The reason for the bootstrap amplifiers can be explained using the following example: consider a broadcaster with available upload bandwidth of 1 Mbit/sec and consider a consumer attached to it with 1bit/sec available download bandwidth but with only 250 Kbit/sec upload. In such a case the consumer will use the total amount of bandwidth from the broadcaster and Other joining consumers will have bandwidth of only 250 Kbits/sec. However, if there axe available, for example, 20 bootstrap amplifiers, with available upload bandwidth of 250 Kbits/sec, the media can be divided into several pieces in such a way that the total upload bandwidth of the system will be of 20×250=5 Mbits/sec, thus enabling 5 new joined consumers (each downloading 1 Mbit/sec) to fetch a good quality media.

Figure 7:
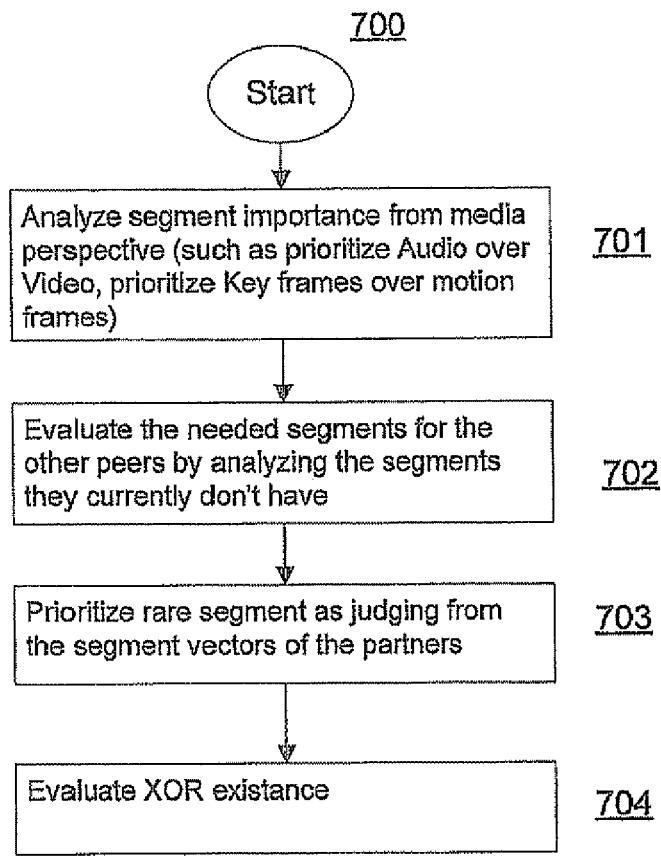
FIG. 7 illustrates a flow diagram of the amplifier's scheduling parameters algorithm, in accordance with a certain embodiment of the invention.

Attention is now drawn to FIG. 7 illustrating a flow diagram of the amplifier's scheduling parameters algorithm in accordance with a certain embodiment of the invention.

The segments priority algorithm role is to prioritize the segments to be retrieved in terms of their importance. The importance of the segments is determined, in accordance with certain embodiments, according to one or more of the following aspects.

1. The importance of the media segment to be retrieved (701), for example, type of segments. For instance, audio has priority over video, within video, the key frames ('I' frames in H.264) have priority over motion estimation frames (such as 'P' and 'B' frames in H.264). Accordingly, by this example, the amplifier will download an audio segment before a video segment.
2. The missing segments at the peers the amplifier serves (702). The amplifier, knowing the segments they have and have already requested (for instance according to the value of the bit indicating availability or not of media data, as described above in the context of information, will request other segments which are useful for them.
3. The rare segments in the network (703). In order to maintain the network in a wealthy situation, the amplifier retrieves file segment parts with the lowest distribution in the network. This is known as the rarest first algorithm in the Bittorrent protocol. More specifically, in the case that there is a segment which resides in very limited number nodes (rare segment), it would be prudent to increase the circulation of this rare segment (thereby rendering the network wealthy, by circulating the segment to more nodes), in order to anticipate a situation that this segment wilt be requested by many nodes, and now, having sufficient copies thereof spread in the network, the likelihood of having sufficient nodes that can upload the requested segment is considerably improved compared to the situation that only few nodes store the segment (whilst many request it), thereby unduly slowing down the downloading rate of media containing the specified segment.
4. Taking segments that are Xored from actual media segments (704). While retrieving a segment from the peers, the Amplifier has to prioritize Xored segments. An example of this is illustrated in FIG. 8:

Assume peer A has segments 1, 2 (801). Further assume peer B has only segment 1 and peer C only segment 2 and that the amplifier should now decide which segment to retrieve. Evidently if the Amplifier fetches the Xor value of segment 1 and 2 from node A (802) it can serve both B and C (will construct segment 2 from segment 1 it has and the Xor(1,2) (803), C will construct segment 1 from segment 2 it has and the Xored segment (804)).

Figure 8:
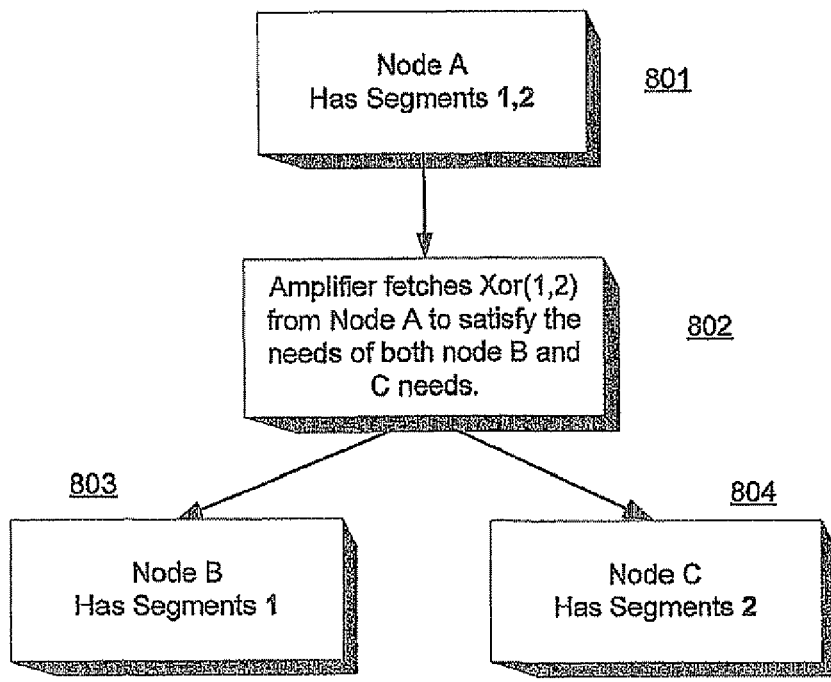
FIG. 8 illustrates the usage of the XOR mechanism, in accordance with a certain embodiment of the invention.

Note that the description with reference to FIG. 8, is only one non-limiting manner of applying a mathematic function on segments.

Note also that the invention is not bound by any one of combination of two or more of the specified 4 parameters. Note also that other parameters may be used in addition to or instead of the specified parameters.

A system and method has been shown in the above embodiments for the effective implementation of amplifiers in a realtime peer-to-peer distribution of media. While various preferred embodiments have been shown and described, it will be understood that ere is no intent to limit invention by such disclosure, but rater, it is intended to cover all modifications and alternate constructions falling within the scope of the invention, as defined is the appended claims. For example, the present invention should not be limited by software/program, computing environment, specific computing hardware, number of nodes, number of media types, number of viewers, number of amplifiers, number of consumers, or number or type of client devices.

It will also be understood that the system according to the invention may be a suitably programmed computer. Likewise, the invention contemplates a computer program being readable by a computer for executing the method of the invention. The invention flier contemplates a machine-readable memory tangibly embodying a program of instructions executable by the machine for executing the method of the invention.

The above enhancements and described functional elements are implemented it various computing environments. For example, the present invention may be implemented on a conventional IBM PC or equivalent, multi-nodal system (e.g., LAN) or networking system (e.g., Internet, WWW, wireless web). The programming of the present invention may be implemented by one of skill in the art of peer-to-peer networking, server based application, and protocol-based network communications programming.

The invention claimed is:

1. A system fog enabling a live transmission of media in a distributed network of nodes that includes swarm nodes; the swarm nodes include consumer nodes that are configured to process transmitted media; the system is configured to dynamically identify a need for additional bandwidth required for the live transmission of said media to said consumer nodes, and in response thereto to allocate to the swarm nodes at least one amplifier node for providing the additional bandwidth, said at least one amplifier node configured to download less than it uploads, and to facilitate the additional bandwidth for the use of said consumer nodes without consuming the live transmitted media within the swarm, thereby enabling the live transmission of said media,
    wherein each amplifier node is configured to operate in order to maximize the amplifier's gain defined as upload bandwidth minus the download bandwidth.

2. A system fog enabling a live transmission of media in a distributed network of nodes that includes swarm nodes; the swarm nodes include consumer nodes that are configured to process transmitted media; the system is configured to dynamically identify a need for additional bandwidth required for the live transmission of said media to said consumer nodes, and in response thereto to allocate to the swarm nodes at least one amplifier node for providing the additional bandwidth, said at least one amplifier node configured to download less than it uploads, and to facilitate the additional bandwidth for the use of said consumer nodes without consuming the live transmitted media within the swarm, thereby enabling the live transmission of said media,
    wherein said amplifier node is configured to maximize amplifier's gain by favoring download of segments that are a mathematical combination of at least two actual media segments and that can be uploaded to other nodes.

3. The system according to claim 2, wherein the mathematical combination being the XOR function.

4. A system fog enabling a live transmission of media in a distributed network of nodes that includes swarm nodes; the swarm nodes include consumer nodes that are configured to process transmitted media; the system is configured to dynamically identify a need for additional bandwidth required for the live transmission of said media to said consumer nodes, and in response thereto to allocate to the swarm nodes at least one amplifier node for providing the additional bandwidth, said at least one amplifier node configured to download less than it uploads, and to facilitate the additional bandwidth for the use of said consumer nodes without consuming the live transmitted media within the swarm, thereby enabling the live transmission of said media, wherein
    the system is configured to dynamically identify the need for additional bandwidth using centralized means, and
    number of additional required amplifiers complies with the following equation: missing bandwidth for download equals to or smaller than sum of the Gains (upload minus download) of all the additional amplifiers.

* * * * *